(12) United States Patent
Fan-Chiang

(10) Patent No.: US 11,360,303 B2
(45) Date of Patent: Jun. 14, 2022

(54) HEAD UP DISPLAY SYSTEM AND DISPLAY METHOD OF HEAD UP DISPLAY SYSTEM

(71) Applicant: Himax Display, Inc., Tainan (TW)

(72) Inventor: Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 17/363,003

(22) Filed: Jun. 30, 2021

(65) Prior Publication Data

US 2021/0325676 A1 Oct. 21, 2021

Related U.S. Application Data

(62) Division of application No. 16/736,821, filed on Jan. 8, 2020, now abandoned.

(51) Int. Cl.
*G02B 27/01* (2006.01)
*G02F 1/1343* (2006.01)
*B60K 35/00* (2006.01)

(52) U.S. Cl.
CPC .......... *G02B 27/0101* (2013.01); *B60K 35/00* (2013.01); *G02B 27/0179* (2013.01); *G02F 1/134309* (2013.01); *B60K 2370/1529* (2019.05); *G02B 2027/0185* (2013.01)

(58) Field of Classification Search
CPC ............ G02B 27/0101; G02B 27/0179; G02B 2027/0185; G02B 2027/0145; B60K 35/00; B60K 2370/1529; G02F 1/134309
See application file for complete search history.

(56) References Cited

U.S. PATENT DOCUMENTS

| | | | |
|---|---|---|---|
| 2017/0261746 A1* | 9/2017 | Tam | G06T 19/006 |
| 2018/0124364 A1* | 5/2018 | Yata | H04N 9/3179 |
| 2019/0204607 A1* | 7/2019 | Wei | G02F 1/29 |

* cited by examiner

*Primary Examiner* — Angela K Davison
(74) *Attorney, Agent, or Firm* — JCIPRNET

(57) ABSTRACT

A head up display system is provided and includes an image source, an image adjustment device, a controller, and a reflector. The image source is adapted to output an image with an image light traveling in a light path. The image adjustment device is positioned on the light path of the image light, wherein the image adjustment device comprises a liquid crystal panel. The controller is adapted to control the image adjustment device. The reflector is adapted to reflect the image light passing through the image adjustment device to a projection screen. A display method of a head up display system is also provided in the disclosure.

4 Claims, 4 Drawing Sheets

HEAD UP DISPLAY SYSTEM AND DISPLAY METHOD OF HEAD UP DISPLAY SYSTEM

CROSS-REFERENCE TO RELATED APPLICATION

This application is a divisional application of and claims the priority benefit of U.S. application Ser. No. 16/736,821, filed on Jan. 8, 2020. The entirety of the above-mentioned patent application is hereby incorporated by reference herein and made a part of this specification.

BACKGROUND

Technical Field

The disclosure is related to a display technique, and particularly, to a head up display system and a display method thereof.

Description of Related Art

In recent years, a head-up display (HUD) that projects light onto the windshield of the vehicle such as an automobile, a train, a ship, a construction machine, an aircraft, or an agricultural machine, or a combiner disposed in the vicinity of the windshield as a screen, to display an image is known. The HUD reflects images on the windshield or the like to display information into drivers' field of view. The images projected onto the windshield may require different imaging distances so that some of the information in the projected image would be presented in a far image that is able to be integrated into the real environment while some of the information in the projected image would be presented in a near image, which enables the driver to confirm route guidance, emergency information, vehicle status, and the like without largely changing the line of sight.

SUMMARY

The disclosure is related to a head up display system capable of dynamically adjusting the imaging condition of the image.

The disclosure is related to a display method of a head up display system to dynamically adjust the imaging condition of the image.

In some embodiments of the disclosure, a head up display system includes an image source, an image adjustment device, a controller, and a reflector. The image source is adapted to output an image with an image light traveling in a light path. The image adjustment device is positioned on the light path of the image light, wherein the image adjustment device comprises a liquid crystal panel. The controller is adapted to control the image adjustment device. The reflector is adapted to reflect the image light passing through the image adjustment device to a projection screen.

In some embodiments of the disclosure, the liquid crystal panel includes a first electrode, a second electrode and a liquid crystal layer disposed between the first electrode and the second electrode.

In some embodiments of the disclosure, each of the first electrode and the second electrode completely and continuously covers an active area of the liquid crystal panel.

In some embodiments of the disclosure, the image adjustment device further includes a second liquid crystal panel positioned on the light path.

In some embodiments of the disclosure, the liquid crystal panel is a phase retarder, the second liquid crystal panel is a liquid crystal lens, and the second liquid crystal panel is positioned between the liquid crystal and the image source.

In some embodiments of the disclosure, the second liquid crystal panel includes a first electrode, a second electrode and a liquid crystal layer disposed between the first electrode and the second electrode, and the first electrode, the second electrode or both is patterned into pixels.

In some embodiments of the disclosure, the controller controls the liquid crystal panel and the second liquid crystal panel to operate independently.

In some embodiments of the disclosure, one or both of the liquid crystal panel and the second liquid crystal panel includes electrodes patterned into irregular patterns.

In some embodiments of the disclosure, one of the liquid crystal panel and the second liquid crystal panel is positioned at a first focal plane of the image source and the other of the liquid crystal panel and the second liquid crystal panel is positioned at a second focal plane of the image source.

In some embodiments of the disclosure, the image source includes a display panel and a light source providing an initial light to the display panel.

In some embodiments of the disclosure, the display panel includes a liquid crystal on silicon panel-spatial light modulator.

In some embodiments of the disclosure, the light source includes a laser light source, an LED light source, or a combination thereof.

In some embodiments of the disclosure, the reflector includes a concave mirror.

In some embodiments of the disclosure, a display method of a head up display system includes the following steps, but not limited thereto. An image us provided by an image source. An image light of the image is adjusted by an image adjustment device that includes a liquid crystal panel. The image light passing through the image adjustment device is reflected to a projection screen.

In some embodiments of the disclosure, an imaging position of the image is adjusted by the image adjustment device.

In some embodiments of the disclosure, a size of the image is adjusted by the image adjustment device.

In some embodiments of the disclosure, the image adjustment device includes a first liquid crystal panel and a second liquid crystal panel, the first liquid crystal panel is positioned at a first focal plane of the image source, the second liquid crystal panel is positioned at a second focal plane of the image source, and the first liquid crystal panel and the second liquid crystal panel operate in a diffusing mode in different time sequences.

In view of the above, the head up display system in accordance with the embodiments of the disclosure includes an image adjustment device that is comprised of at least one liquid crystal display panel capable of dynamically adjust the imaging condition of the image. Accordingly, the imaging distance of the image generated by the head up display system may be adjusted to achieve multiple distances of image. In addition, the image adjustment device may be an electrical controllable device to achieve the multi-levels adjustments for the imaging conditions so that the head up display system may generate various images based on different situations.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
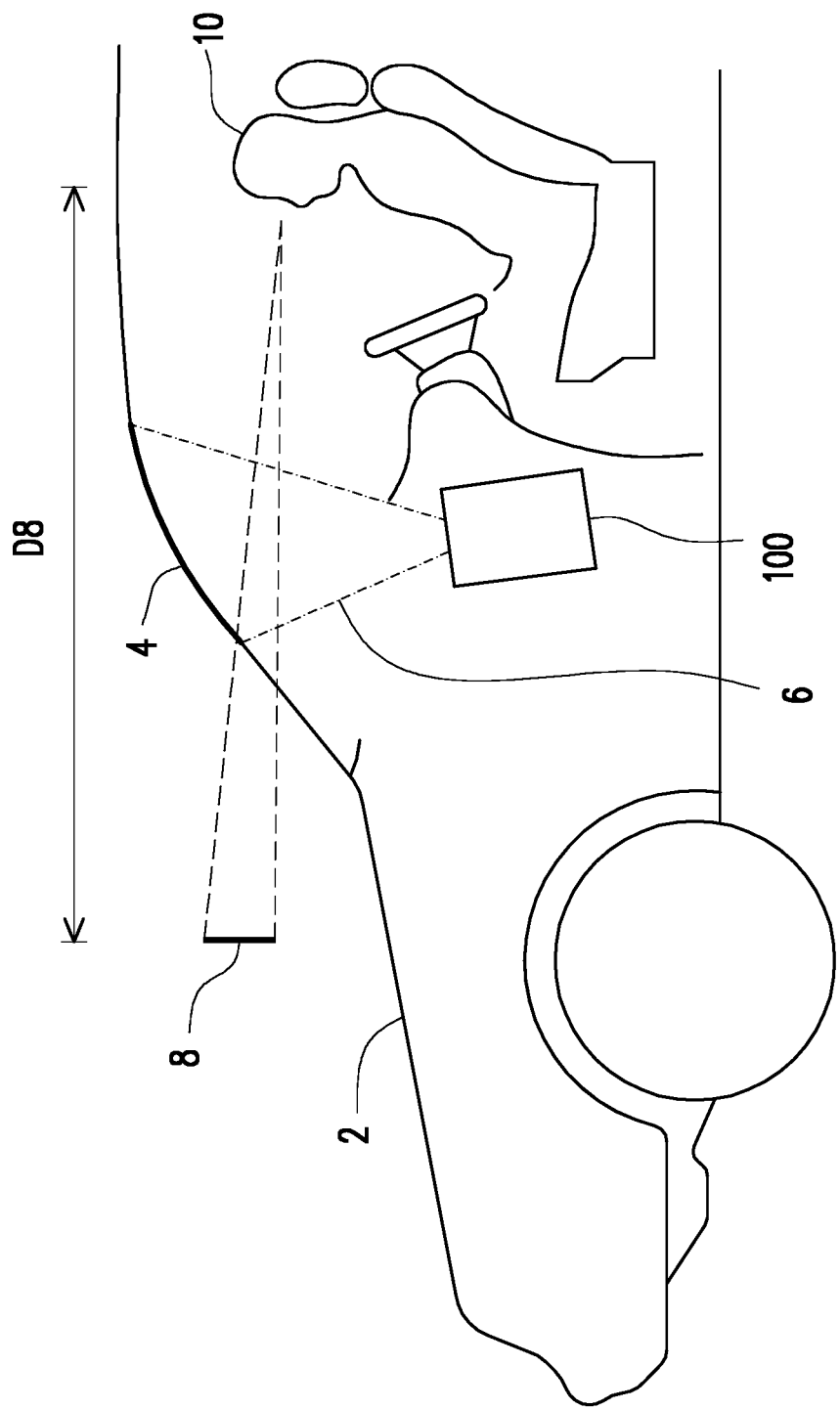
FIG. 1 schematically illustrates an application of a head up display system in accordance with some embodiments of the disclosure.

FIG. 1 schematically illustrates an application of a head up display system in accordance with some embodiments of the disclosure. In FIG. 1, the head up display system 100 is, for example, equipped on an automobile 2, and FIG. 1 only illustrates a portion of the automobile 2. The head up display system 100 may generate an image projecting onto a windshield 4 of the automobile 2. Specifically, the image light 6 of the image projected onto the windshield 4 may create a virtual image 8 that the user 10, the driver, may observe. In the present embodiment, the imaging distance D8 of the virtual image 8 observed by the user 10 may be adjustable by the head up display system 100. If the virtual image 8 contains the information that is suitable to be merged into the environment that is seen by the user 10, the imaging distance D8 of the virtual image 8 may be adjusted to be relatively large as a far image. If the virtual image 8 contains the information that relates to the vehicle status such as the speedometer, the tachometer, the odometer, the engine coolant temperature gauge, the fuel gauge, the turn indicators, the gearshift position indicator, the seat belt warning light, the parking-brake warning light, the engine-malfunction lights, the like, or any combination thereof, the imaging distance D8 of the virtual image 8 may be adjusted to be relatively small as a near image. Accordingly, the head up display system 100 may provide an intuitional visual effect for the user 10 without largely changing the line of sight of the user 10.

Figure 2:
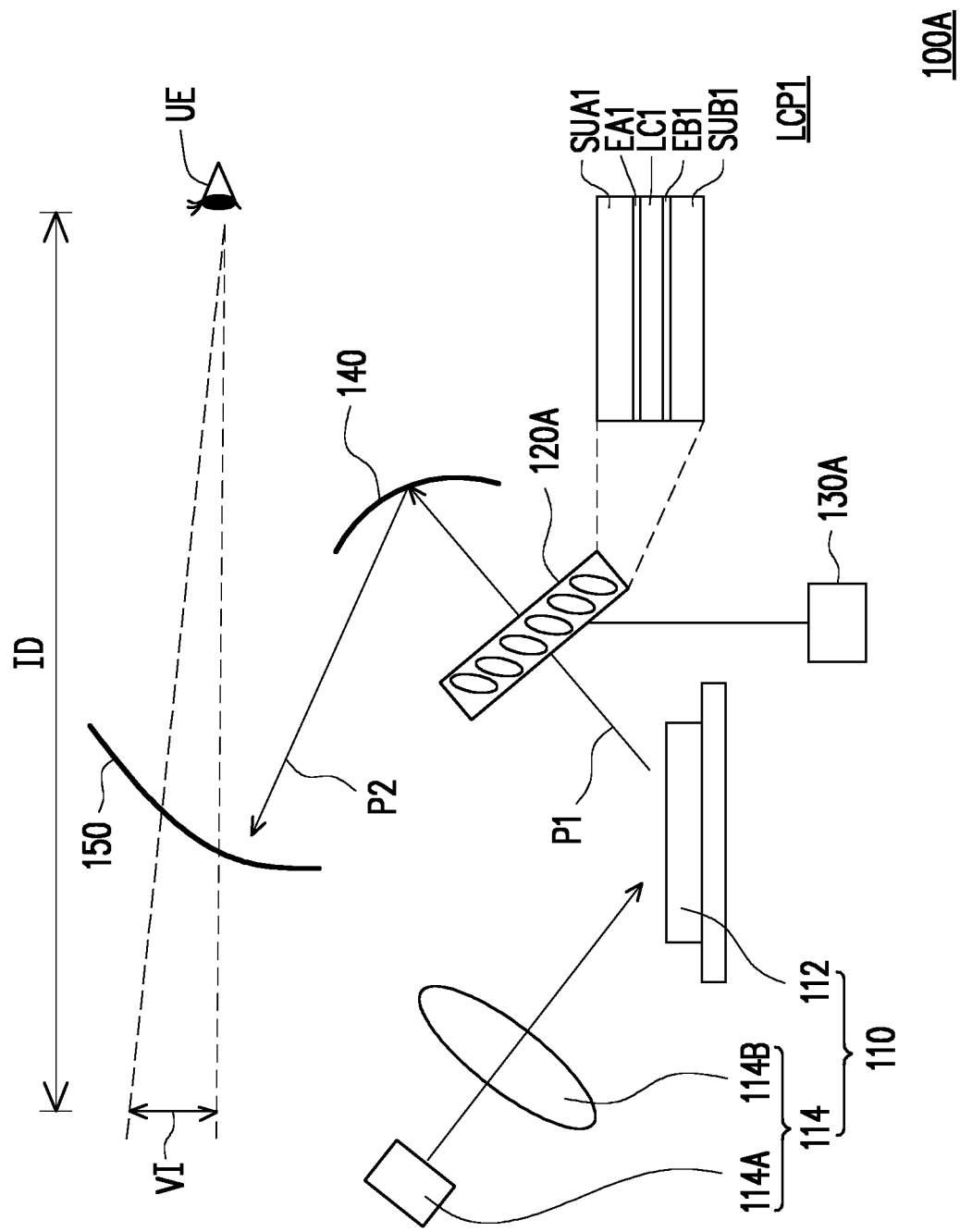
FIG. 2 schematically illustrates a head up display system in accordance with some embodiments of the disclosure.

FIG. 2 schematically illustrates a head up display system in accordance with some embodiments of the disclosure. In FIG. 2, the head up display system 100A may serve as an exemplary example for the head up display system 100 shown in FIG. 1; however, the disclosure is not limited thereto. The head up display system 100A may include an image source 110, an image adjustment device 120A, a controller 130A, and a reflector 140. The image source 110 may generate an image with the image light traveling in a light path P1. The image adjustment device 120A may be positioned on the light path P1. The controller 130A may be electrically communicated with the image adjustment device 120A and adapted to control the operation of the image adjustment device 120A. The reflector 140 may be positioned at the downstream of the image adjustment device 120A on the light path P1. The image light generated by the image source 110 may be subjected to the adjustment of the image adjustment device 120A and continuously travel along the light path P1 until being reflected by the reflector 140. The reflector 140 may reflect the image light passing through the image adjustment device 120A to travel in another light path P2 and irradiate a projection screen 150 such as the windscreen 4 of the automobile 2 shown in FIG. 1 to generate the virtual image VI that is observed by the user's eye UE.

The image source 110 may include a display panel 112 and a light source 114. The light source 114 may include a light emitting device 114A and an optical member 114B that is positioned between the light emitting device 114A and the display panel 112. The light emitting device 114A may include a laser, an LED, the like, or a combination thereof to generate an initial light for the display panel 112. The optical member 114B may include lens, beam splitter, polarizer, the like, or any combination thereof, to collimate or modify the initial light generated by the light emitting device 114A so that the initial light may irradiate onto the display panel 112 with a required manner, such as a required strength, a required color temperature, and/or the like. The display panel 112 may generate an intermediate image by using the initial light provided by the light source 114. Specifically, the display panel 112 may transfer the initial light to an image light travelling in the light path P1 and generate the intermediate image at a prescribed position. The display panel 112 may be a reflective type display panel and may include a liquid crystal on silicon-spatial light modulator (LCoS-SLM). In some alternative instances, the display panel 112 may be other type of display panel such as a transmissive type display panel or the like. In some embodiments, the image source 110 may include a self-illumination display panel such as an organic light emitting display panel or the like, such that the image source 110 may not include the light source 114.

The image adjustment device 120A may be an optical device adapted to adjust the condition of the image light provided by the image source 110. In some embodiments, the image adjustment device 120A may include a liquid crystal panel LCP1. For example, the liquid crystal panel LCP1 may include a first substrate SUA1, a second substrate SUB1 opposite to the first substrate SUA1, a first electrode EA1 disposed on the first substrate SUA1, a second electrode EB1 disposed on the second substrate SUB1, and a liquid crystal layer LC1 between the first electrode EA1 and the second electrode EB1. The first electrode EA1 and the second electrode EB1 may each completely and continuously cover an active area of the liquid crystal panel LCP1, wherein the active area of the liquid crustal panel LCP1 allows the image light generated by the image source 110 to transmit therethrough. The liquid crystal panel LCP1 having continuous and non-patterned electrodes at the active area may serve as a phase retarder which may alter the polarization state of the wave of a light travelling through it. Namely, the image light from the image source 110 may pass the liquid crystal panel LCP1 and be subjected to the alteration of the polarization state.

The controller 130A may be electrically communicated with the image adjustment device 112A. The controller 130A may input respective voltages to the first electrode EA1 and the second electrode EB1 of the liquid crystal panel LCP1 so that the liquid crystal panel LCP1 may provide desired optical effect such as phase retardation to the wave of the image light provided by the image source 110. In addition, the optical effect provided by the liquid crystal panel LCP1 may be stepless controlled since the liquid crystal panel LCP1 is electronically controllable. In some embodiments, the controller 130A may be also electrically communicated to the image source 110 or the controller (not shown) of the image source 110 and may control the operation of the image adjustment device 120A based on the information of the intermediate image to be generated by the image source 110.

The reflector 140 may be adapted to reflect the image light toward the projection screen 150 after the image light passes through the image adjustment device 120A. The image light provided by the image source 110 initially traveling in the light path P1 may be reflected to travel in the light path P2 by the reflector 140. The image light travelling in the light path P2 may project on the projection screen 150 to create the virtual image VI observed by the user's eye UE. In some embodiments, the reflector 140 may be a concaved mirror. The curvature of the concaved mirror may determine the imaging distance ID of the virtual image VI. The greater the curvature of the concaved mirror is the further the imaging distance ID is. In some embodiments, the concaved mirror may have a non-fixed curvature so that the reflecting effect of the reflector 140 may be suitable for various curvatures of the projection screen 150.

In the head up display system 100A, the image source 110 may provide the image light travelling in the light path P1 to generate an intermediate image at a prescribed focal plane and the image light may be reflected by the reflector 140 to irradiate onto the projection screen 150 to generate the virtual image VI that is observed by the user's eye UE. In some instances, the image adjustment device 120A may be controlled to present a transparent state without providing an optical adjustment function so that the intermediate image may be positioned at the prescribed focal plane and the virtual image VI may have a first status of the imaging distance ID. In some alternative instances, the image adjustment device 120A may be controlled to serve as a phase retarder, and the image adjustment device 120A may alter the phase retardation of the image light provided by the image source 110. As such, the imaging position of the intermediate image may be adjusted and the imaging distance ID of the virtual image VI may be changed accordingly. For example, the virtual image VI may have a second status of the imaging distance ID and the imaging distance ID in the second status is different than the imaging distance ID in the first status. Accordingly, the image adjustment device 120A may adjust the imaging light to achieve various imaging distances ID of the virtual image VI to enhance the flexibility of the real use.

In the present embodiment, the imaging distance ID may be adjusted based on the information to be presented in the virtual image VI. For example, the information of route guidance may be presented in the virtual image VI with a relative larger imaging distance ID and the information of the speedometer, the tachometer, the odometer, the engine coolant temperature gauge, the fuel gauge or the like may be presented in the virtual image VI with a relative smaller imaging distance ID. In some instances, the virtual image VI with the larger imaging distance ID may be merged into the environment that is seen by the user's eye UE and the virtual image VI with the shorter imaging distance ID may be observed as an image presented on the projection screen 150, but the disclosure is not limited thereto. In addition, the image adjustment device 120A may adjust the imaging result of the virtual image VI in a stepless manner so that the head up display system 100B may provide a desirable display effect on various projection screens such as the windshields with various curvatures and oblique degrees. In other words, the application of the head up display system 100B may be more flexible without being restricted to be collocated with a prescribed type of the projection screen 150.

Figure 3:
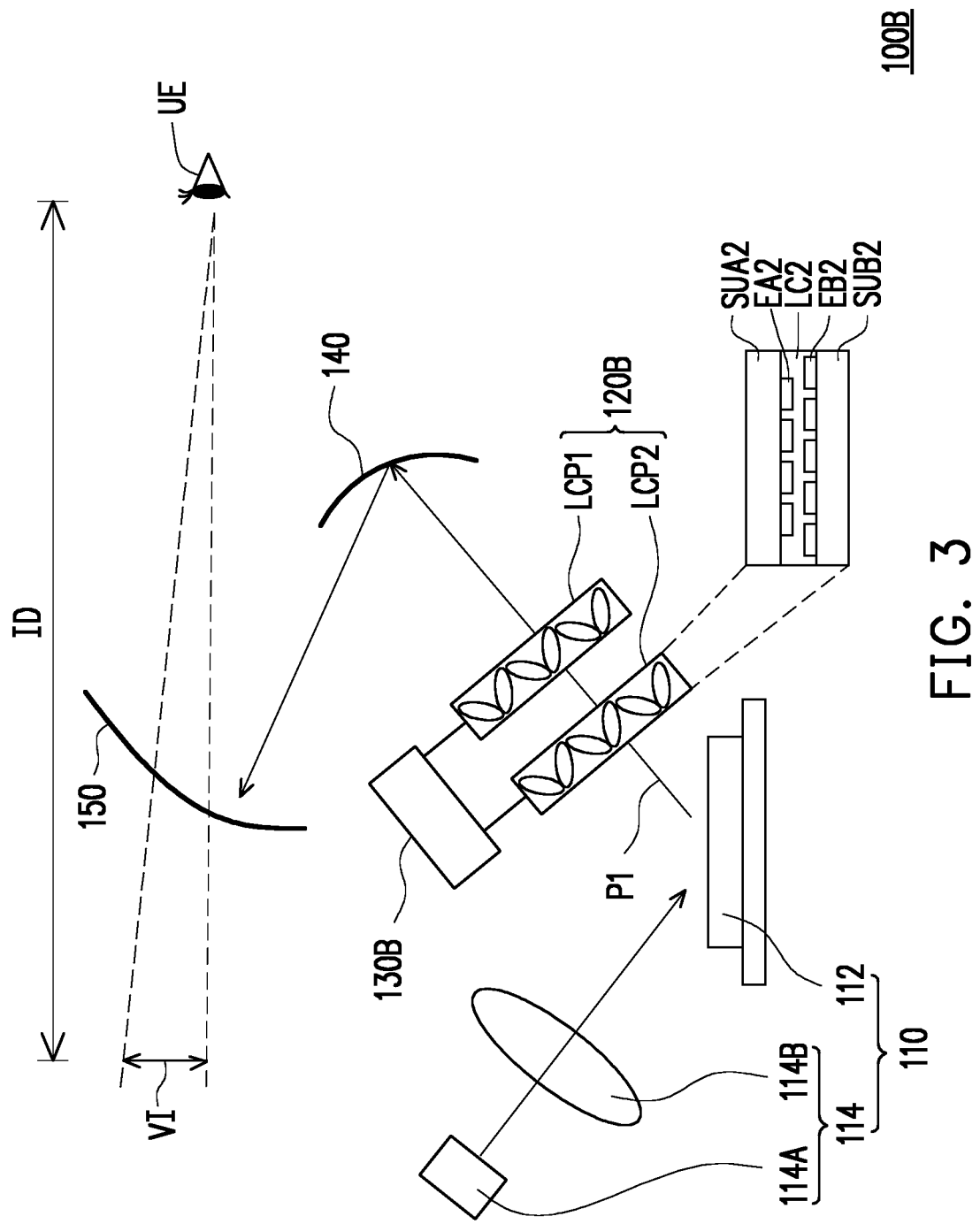
FIG. 3 schematically illustrates a head up display system in accordance with some embodiments of the disclosure.

FIG. 3 schematically illustrates a head up display system in accordance with some embodiments of the disclosure. In FIG. 3, the head up display system 100B may serve as an exemplary example for the head up display system 100 shown in FIG. 1; however, the disclosure is not limited thereto. Similar to the head up display system 100A, the head up display system 100B includes an image source 110, an image adjustment device 120B, a controller 130B, and a reflector 140 and is adapted to project the image light onto a projection screen 150 for creating the virtual image VI capable of observed by the user's eye UE. In the two embodiments depicted in FIG. 2 and FIG. 3, the same or similar elements are indicated by the same or similar reference numbers; for example, the image source 110, the reflector 140 and the projection screen 150 may be the same of those described in the above embodiment in FIG. 2 so that the details for the image source 110, the reflector 140 and the projection screen 150 may refer to the detail descriptions of the above embodiment.

In the present embodiment, the image adjustment device 120B may include a liquid crystal panel LCP1 positioned between the image source 110 and the reflector 140, and a liquid crystal panel LCP2 positioned between the liquid crystal panel LCP1 and the image source 110. The controller 130B is electrically communicated with both the liquid crystal panel LCP1 and the liquid crystal panel LCP2 and is adapted to control the operation of the liquid crystal panel LCP1 and the liquid crystal panel LCP2. Both the liquid crystal panel LCP1 and the liquid crystal panel LCP2 are positioned on the light path P1 of the image light provided by the image source 110 and between the image source 110 and the reflector 140.

The liquid crystal panel LCP1 may be electronically controllable and provide the optical function as a phase retarder to adjust the polarization of the wave of the image light provided by the image source 110. The liquid crystal panel LCP1 may have a similar structure and function as the liquid crystal panel LCP1 depicted in FIG. 2. The liquid crystal panel LCP2 may also be electronically controllable and may serve as a liquid crystal lens. Specifically, the liquid crystal panel LCP2 may include a first substrate SUA2, a second substrate SUB2 opposite to the first substrate SUA2, a first electrode EA2 disposed on the first substrate SUA2, a second electrode EB2 disposed on the second substrate SUB2, and a liquid crystal layer LC2 between the first electrode EA2 and the second electrode EB2. The first electrode EA2 and the second electrode EB2 are patterned into pixels in the present embodiment to achieve the function of a liquid crystal lens.

The image light provided by the image source 110 may travel in the light path P1, sequentially pass through the liquid crystal panel LCP2 and the liquid crystal panel LCP1, and be reflected by the reflector 140 to irradiate onto the projection screen 150 and create the virtual image VI capable of being observed by the user's eye UE. The liquid crystal panel LCP2 may be controlled by the controller 130B and may adjust the focus of the image light provided by the image source 110 so that the size and/or the imaging position of the intermediate image generated by the image source 110 may be adjusted and the size and/or the imaging distance ID of the virtual image VI may be changed accordingly. The liquid crystal panel LCP1 may be controlled by the controller 130B to alter the polarization of the image light passing through the liquid crystal panel LCP1 so that the imaging distance ID of the virtual image VI may be further adjusted by the liquid crystal panel LCP1.

By the operation and control of both the liquid crystal panel LCP1 and the liquid crystal panel LCP2, the size, the imaging distance or both of the virtual image VI may be adjusted based on the information presented in the virtual image VI. In some embodiments, the liquid crystal panel LCP1 and the liquid crystal panel LCP2 may operate independently and provide respective optical adjustment functions in a stepless manner. For example, the controller 130B may control the liquid crystal panel LCP2 to operate a convex/concave lens function while control the liquid crystal panel LCP1 to present a transparent status without having a phase retardation function. Alternatively, the controller 130B may control the liquid crystal panel LCP1 to present a phase retardation function while control the liquid crystal panel LCP2 to present a transparent status without having a convex/concave lens function. In another embodiment, the controller 130B may control the liquid crystal panel LCP1 to present a phase retardation function and also control the liquid crystal panel LCP2 to operate a convex/concave lens function. Therefore, the virtual image VI may be created with various imaging conditions. In some embodiments that is not shown in the drawing, the image adjustment device may include the liquid crystal panel LCP2 without the liquid crystal panel LCP1 and may also achieve the effect of generating the virtual image VI at various imaging conditions.

Figure 4:
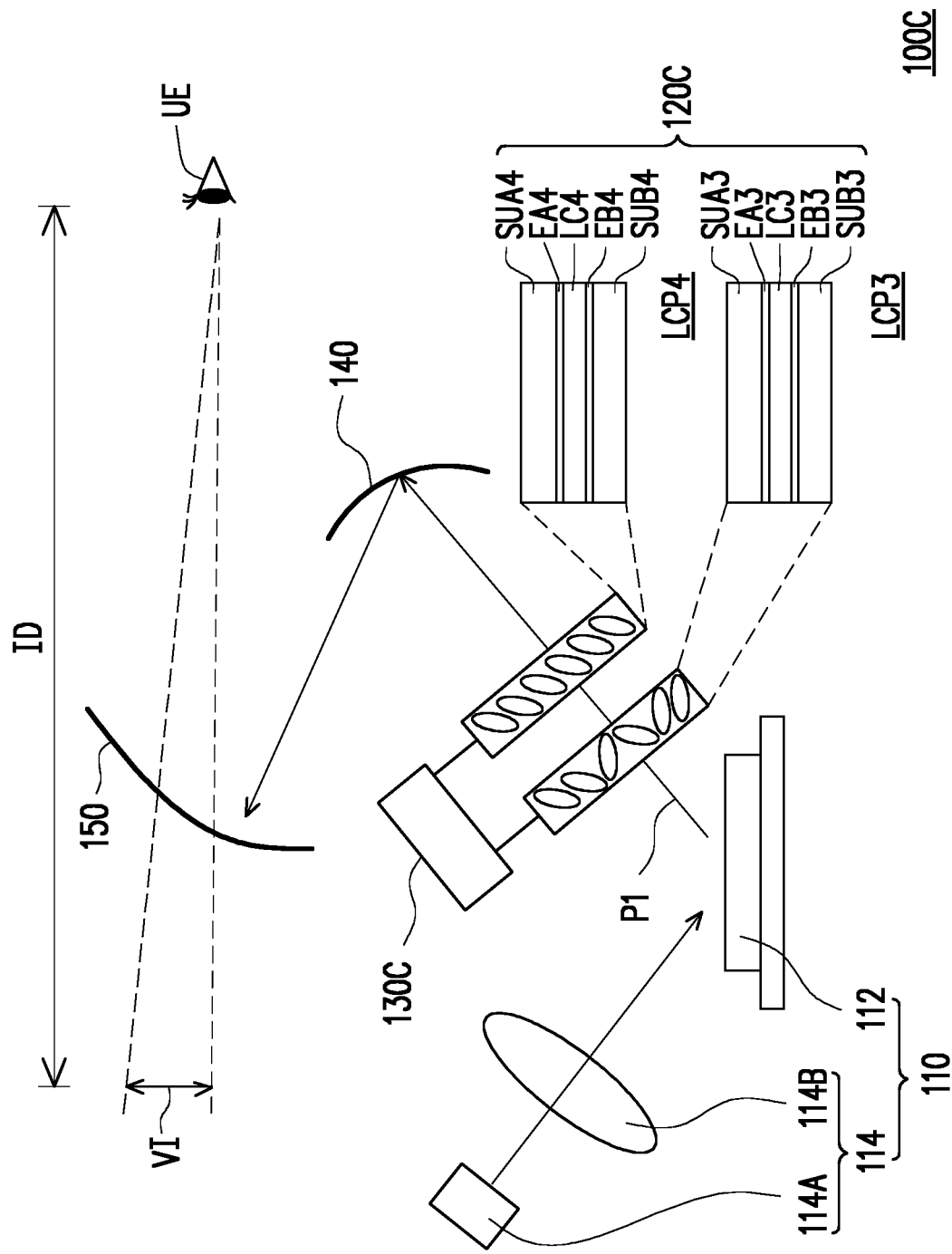
FIG. 4 schematically illustrates a head up display system in accordance with some embodiments of the disclosure.

FIG. 4 schematically illustrates a head up display system in accordance with some embodiments of the disclosure. In FIG. 4, the head up display system 100C may serve as an exemplary example for the head up display system 100 shown in FIG. 1; however, the disclosure is not limited thereto. Similar to the head up display system 100A in FIG. 2, the head up display system 100C includes an image source 110, an image adjustment device 120C, a controller 130C, and a reflector 140 and is adapted to project the image light onto a projection screen 150 to create the virtual image VI observed by the user's eye UE. In the two embodiments of FIG. 2 and FIG. 4, the same or similar elements are indicated by the same or similar reference numbers; for example, the image source 110, the reflector 140 and the projection screen 150 may be the same of those described in the above embodiments depicted in FIG. 2 so that the details for the image source 110, the reflector 140 and the projection screen 150 may refer to the detail descriptions of the above embodiment.

In the present embodiment, the image adjustment device 120C may include a liquid crystal panel LCP3 between the image source 110 and the reflector 140, and a liquid crystal panel LCP4 positioned between the liquid crystal panel LCP3 and the reflector 140. The controller 130C is electrically communicated with both the liquid crystal panel LCP3 and the liquid crystal panel LCP4 and is adapted to control the operations of the liquid crystal panel LCP3 and the liquid crystal panel LCP4. Both the liquid crystal panel LCP3 and the liquid crystal panel LCP4 are positioned on the light path P1 of the image light provided by the image source 110.

In the present embodiment, the liquid crystal panel LCP3 may be electronically controllable and may include a first substrate SUA3, a second substrate SUB3 opposite to the first substrate SUA3, a first electrode EA3 disposed on the first substrate SUA3, a second electrode EB3 disposed on the second substrate SUB3, and a liquid crystal layer LC3 between the first electrode EA3 and the second electrode EB3. The first electrode EA3 and the second electrode EB3 are patterned into irregular patterns in the present embodiment though FIG. 4 does not show the irregular patterns for illustration purpose. The liquid crystal panel LCP3 may serve as an electronically controllable diffuser and be controlled by the controller 130C to operate required optical function.

The liquid crystal panel LCP4 may have a structure similar to that of the liquid crystal panel LCP4. Specifically, the liquid crystal panel LCP4 may include a first substrate SUA4, a second substrate SUB4 opposite to the first substrate SUA4, a first electrode EA4 disposed on the first substrate SUA4, a second electrode EB4 disposed on the second substrate SUB4, and a liquid crystal layer LC4 between the first electrode EA4 and the second electrode EB4. The first electrode EA4 and the second electrode EB4 are patterned into irregular patterns in the present embodiment though FIG. 4 does not present the irregular patterns for illustration purpose. The liquid crystal panel LCP4 may serve as an electronically controllable diffuser and be controlled by the controller 130C to operate required optical function.

The image source 110 may generate the intermediate image at multiple focal planes and the imaging distance ID of the virtual image VI may be determined based on the position of the intermediate image. In the present embodiment, the liquid crystal panel LCP3 is positioned at a first focal plane of the image source 110 and the liquid crystal panel LCP4 is positioned at a second focal plane of the image source 110. When the image source 110 generates the intermediate image at the first focal plane, the virtual image VI may be created at a first status of the imaging distance ID. In addition, the controller 130C may control the liquid crystal panel LCP3 to operate the diffuser function and control the liquid crystal panel LCP4 to present a transparent status without having the diffusing effect. As such, the virtual image VI created at the first status of the imaging distance ID may be enlarged, when compared to the condition that the liquid crystal panel LCP3 and the liquid crystal panel LCP4 both present in the transparent status. Similarly, when the image source 110 generates the intermediate image at the second focal plane, the virtual image VI may be created at a second status of the imaging distance ID. In addition, the controller 130C may control the liquid crystal panel LCP4 to operate the diffuser function and control the liquid crystal panel LCP3 to present a transparent status without having the diffusing effect. As such, the virtual image VI created at the second status of the imaging distance ID may be enlarged, when compared to the condition that the liquid crystal panel LCP3 and the liquid crystal panel LCP4 both present in the transparent status. In some embodiments, the liquid crystal panel LCP3 and the liquid crystal panel LCP4 may operate the diffuser function based on the intermediate image generated by the image source without simultaneously present the diffuser function. In other words, the liquid crystal panel LCP3 and the liquid crystal panel LCP4 operate in a diffusing mode in different time sequences. In some embodiments, the image source 110 may generate the intermediate image at more focal planes, and the image adjustment device 120C may include more liquid crystal panels positioned at respective focal planes of the image source 110. Based on the above embodiments, one or more of the liquid crystal panel LCP1 to LCP4 may be disposed between the image source 110 and the reflector 140 to adjust the imaging condition of the virtual image VI for enhancing the flexibility of the imaging effect.

In light of the foregoing, the head up display system in accordance with some embodiments of the disclosure includes an image adjustment device capable of adjusting the imaging distance and/or the size of the created virtual image so that the head up display system have various imaging results to enhance the flexibility of real use.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display method of a head up display system, comprising:
    generating an intermediate image by an image source;
    adjusting an image light of the intermediate image by an image adjustment device, wherein the image adjustment device comprises a first liquid crystal panel and a second liquid crystal panel, the first liquid crystal panel is positioned at a first focal plane of the image source, the second liquid crystal panel is positioned at a second focal plane of the image source, and the first liquid crystal panel and the second liquid crystal panel operate in a diffusing mode in different time sequences; and
    reflecting the image light passing through the image adjustment device to a projection screen.

2. The method of claim 1, wherein an imaging position of the intermediate image is adjusted by the image adjustment device.

3. The method of claim 1, wherein a size of the intermediate image is adjusted by the image adjustment device.

4. A head up display system, comprising:
    an image source adapted to output an intermediate image with an image light traveling in a light path;
    an image adjustment device positioned on the light path of the image light, wherein the image adjustment device comprises a first liquid crystal panel;
    a controller adapted to control the image adjustment device; and
    a reflector adapted to reflect the image light passing through the image adjustment device to a projection screen,
    wherein the image adjustment device further comprises a second liquid crystal panel positioned on the light path, and the controller controls the first liquid crystal panel and the second liquid crystal panel to operate independently, one or both of the first liquid crystal panel and the second liquid crystal panel comprises electrodes patterned into irregular patterns,
    wherein one of the first liquid crystal panel and the second liquid crystal panel is positioned at a first focal plane of the image source and the other of the first liquid crystal panel and the second liquid crystal panel is positioned at a second focal plane of the image source.

* * * * *